United States Patent [19]

Van Der Gaag et al.

[11] 4,308,456
[45] Dec. 29, 1981

[54] METHOD AND APPARATUS FOR MEASURING THE FREQUENCY OF RADIATION

[75] Inventors: Leonard C. Van Der Gaag; Allen Hooker, both of San Jose; Gerald Puetz, Cupertino, all of Calif.

[73] Assignee: Versatile Integrated Modules, Sunnyvale, Calif.

[21] Appl. No.: 95,639

[22] Filed: Nov. 19, 1979

[51] Int. Cl.$^3$ ............................................. G01J 3/50
[52] U.S. Cl. ...................................... 250/226; 356/402; 356/416
[58] Field of Search ............... 250/226; 356/402, 416, 356/411; 209/580, 582

[56] References Cited

U.S. PATENT DOCUMENTS 4,057,146 11/1977 Castaneda et al. ................. 250/226
4,057,352 11/1977 Babb ................................... 250/226

*Primary Examiner*—David C. Nelms
*Assistant Examiner*—Edward P. Westin
*Attorney, Agent, or Firm*—Warren M. Becker

[57] ABSTRACT

A method and apparatus for measuring the frequency of radiation is described comprising a pair of filters (2,3) or a beam splitter (30) responsive to radiation from a source of radiation (4) for providing a first output having a magnitude which increases and a second output having a magnitude which decreases with an increase in the frequency of said radiation, a divider (11) for providing a ratio of the magnitudes of said first and second outputs and a comparator (14) and memory (17) responsive to the ratio from said divider (11) for providing an output corresponding to the frequency of said radiation.

19 Claims, 5 Drawing Figures

METHOD AND APPARATUS FOR MEASURING THE FREQUENCY OF RADIATION

BACKGROUND OF THE INVENTION

The present invention relates to a method and apparatus for measuring the frequency of radiation in general, and in particular to a method and apparatus for measuring the frequency of electromagnetic radiation in the visible spectrum.

Because of the effect that a change of frequency in the visible spectrum has on a typical human eye in terms of the sensation of color, it is frequently desirable to measure the frequency of radiation from a device in the visible spectrum to determine and distinguish one color from another emitted, scattered or reflected from the device. In the fabrication of light-emitting, scattering and reflecting devices, the need for determining the frequency of the radiation emitted, scattered and/or reflected from the device may be used for controlling the fabrication of the device as well as for determining whether or not the device meets stated color specifications.

In addition to the need for measuring the frequency of visible radiation for industrial and scientific purposes, there is also a great and long-standing need for measuring the frequency of radiation in the visible spectrum being emitted, scattered or reflected from devices and surfaces used in non-scientific and non-industrial applications. For example, in the manufacture and selection of fabrics, in the purchasing of clothes, in the decorating of rooms, including the painting, wall-papering and carpeting thereof, the persons involved in these endeavors frequently are confronted with having to mix and match colors. At the present time, the methods and apparatus available for mixing and matching colors are either relatively sophisticated, complex, and require scientific trained personnel to operate them or they are very unscientific and unsophisticated and leave much to be desired.

The scientific and sophisticated methods and apparatus currently widely employed for measuring the frequency of radiation in the visible spectrum include monochrometers. Monochrometers typically employ prisms and/or gratings for separating visible radiation by color. Typically, there is provided in a monochrometer a prism or grating which is located between a light source and a narrow slit. As the prism or grating is rotated before the slit, light in narrow bands of frequency is transmitted through the slit and detected by a broad band photo-detecting apparatus. The photo-detecting apparatus measures the energy of each of the colors passing through the slit for generating an output corresponding to the spectrum of the radiation source.

In addition to monochrometers, other devices are widely used for measuring the frequency of visible radiation. For example, a series of narrow band filters and filter wheels are widely employed in certain applications for separating the radiation from a source of radiation into its various color bands.

Because of the physical structure and operating characteristics of monochrometers, narrow band filter assemblies and filter wheels heretofore known, the apparatus is relatively expensive, non-portable and requires trained scientific personnel to operate. Consequently, it is not readily available or usable by consumers or other untrained persons.

The less sophisticated methods of mixing and matching colors typically employ the use of color charts and color swatches such as the familiar paint charts often used for mixing and matching new colors with the color of existing painted or otherwise covered surfaces. The use of colored swatches of material are also used for mixing and matching colored fabrics. Needless to say, the wide variety of shades of color, tints and tones, ambient light conditions and the physical condition of the observer makes the mixing and matching of colors using color charts and/or swatches very subjective and frequently results in many mistaken and disappointing selections.

To avoid errors in mixing and matching colors, persons frequently spend an enormous amount of time making their color choices and even then their choices are subject to ambient light conditions which may vary from day to day or are subject to artificial light conditions which may vary from room to room.

SUMMARY OF THE INVENTION

In view of the foregoing, a principal object of the present invention is a relatively inexpensive, reliable, easy to use method and apparatus for measuring the frequency of radiation in the visible spectrum.

Another object of the present invention as described above is a method and apparatus which may be used for measuring the frequency of radiation in the visible spectrum from light-emitting, scattering and reflecting devices and surfaces.

In accordance with the above objects, there is provided a method and apparatus for measuring the frequency of radiation in the visible spectrum providing a first output having a magnitude which increases and a second output having a magnitude which decreases with an increase in the frequency of said radiation; providing a third output corresponding to the ratio of the magnitude of said first and said second outputs and comparing said third output with predetermined values corresponding to pre-selected known frequencies of said radiation for providing an output corresponding to the frequency of said radiation.

In some embodiments of the present invention there is provided filter means for providing the above described first and second outputs. In other embodiments of the present invention there is provided differential beam-splitting means for providing the above described first and second outputs.

With the apparatus disclosed in U.S. Pat. No. 4,061,925, issued on Dec. 6, 1977 to one of the applicants herein and assigned to the assignee of the present application, a method and apparatus according to the present invention may also be used for measuring the frequency of visible radiation in the visible spectrum emitted from a light-emitting device in the presence of ambient light. As disclosed in U.S. Pat. No. 4,061,925, there is provided a means for measuring the intensity of the ambient light in the absence of light from the light-emitting source under test. Following the measurement of the intensity of the ambient light in the absence of light from the emitting source, the intensity of the ambient light, together with the intensity of the light emitted from the source under test, is measured. Thereafter, the two quantities are subtracted for providing the measure of the intensity of the light emitted from the device under test in the presence of ambient light.

In still another embodiment of the present invention an internal light source, such as a tungsten lamp, is provided for illuminating a source of reflected and/or scattered radiation for measuring the frequency of the radiation reflected and/or scattered from the source and, hence, its color, in the absence of ambient light.

BRIEF DESCRIPTION OF THE DRAWING

The above and other objects, features and advantages of the present invention will become apparent in the following detailed description of the accompanying drawing in which.

DETAILED DESCRIPTION OF THE DRAWING

Figure 1:
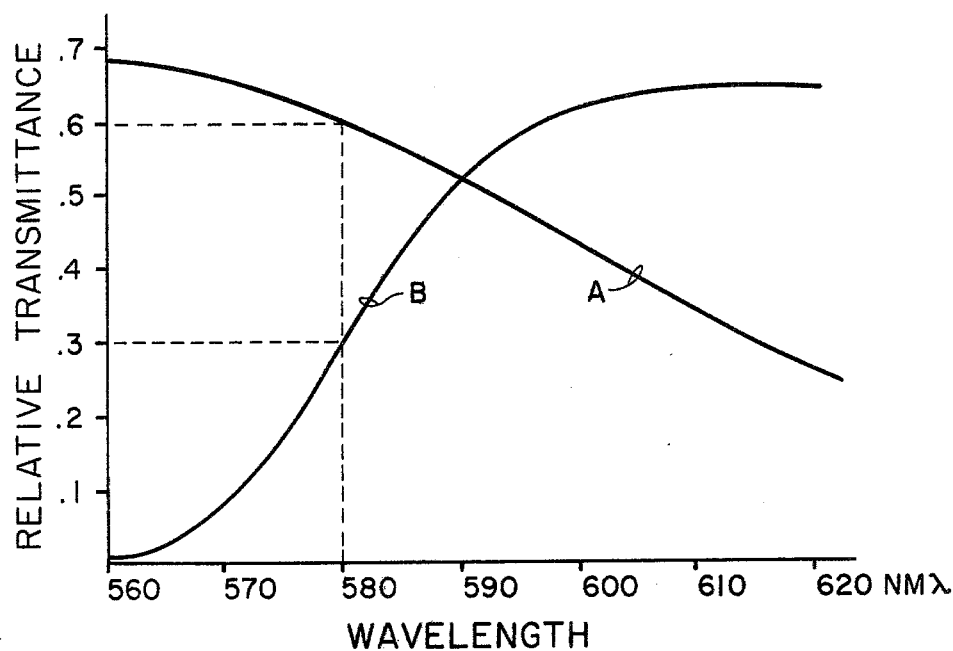
FIG. 1 shows curves representing the relative transmittance as a function of wavelength of a pair of commercially available optical filters.

Referring to FIG. 1, there is provided a pair of curves A and B, showing the relative transmittance of a pair of commercially available optical filters as a function of wavelength over a limited portion of the visible spectrum of from 560 to 620 nanometers. The curve A a curve of is the relative transmittance of a CM-500 filter. The curve B is a curve of the relative transmittance of an 0-58 filter. Both of the filters CM-500 and 0-58 are commercially available from the Hoya Corporation of Palo Alto, California.

In practice, the filters obtained from the Hoya Corporation may be modified slightly by conventional grinding techniques so as to change their response to changes in the wavelength of the radiation transmitted therethrough such that their response is substantially linear over a narrow bandwidth such as, for example, 575–590 nanometers. It will be seen, however, that so long as the ratio of the relative transmittance of the filters for selected wavelengths is unique, the filter characteristics need not necessarily be linear. It will also be appreciated that the same or other filters, such as interference, reflective and absorbing filters, can be used with or without modification to obtain linear as well as non-linear frequency response characteristics over other ranges of wavelengths, depending upon the requirements of a particular application. As indicated, the importance of the curves A and B of FIG. 1 and the importance of the operating characteristics of the optical devices which they represent lies in the fact that for all wavelengths within a specific bandwidth such as, for example, 575–590 nanometers, there is a unique ratio of the values of the curves A and B for all incremental wavelengths throughout the specified bandwidth.

Figure 2:
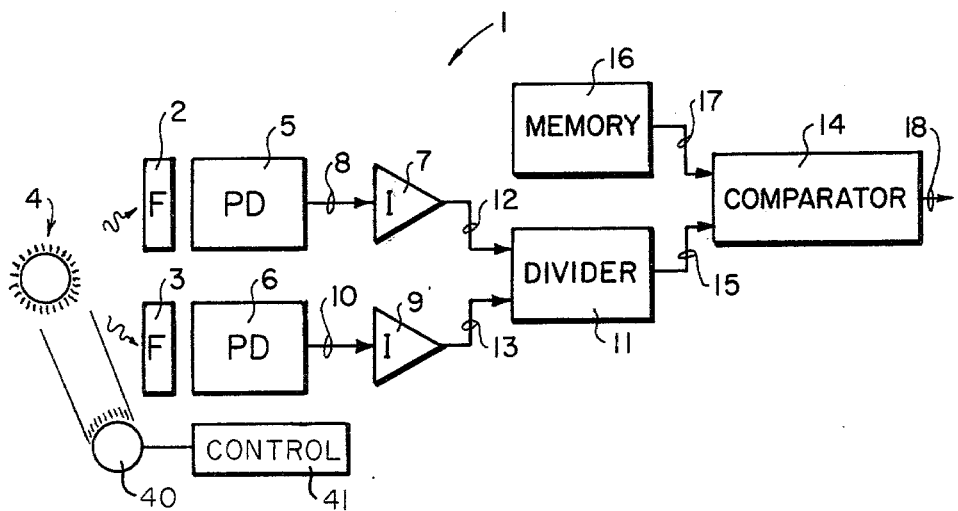
FIG. 2 is a block diagram of an apparatus according to the present invention.

Referring to FIG. 2, there is provided in accordance with the present invention a frequency measuring apparatus designated generally as 1. The apparatus 1 is provided with a pair of filters 2 and 3. The filters 2 and 3 comprise, respectively, the CM-500 and 0-58 filters described above with respect to FIG. 1. They are provided for receiving radiation from a source of emitted, scattered or reflected radiation designated generally as 4. Optically coupled to the filters 2 and 3, there is provided a pair of photo-detectors 5 and 6, respectively.

The output of photo-detector 5 is coupled to the input of an integrating circuit 7 by means of a line 8. The output of the photo-detector 6 is coupled to an integrating circuit 9 by means of a line 10. The outputs of the integrating circuits 7 and 9 are coupled to the inputs of a divider circuit 11 by means of a pair of lines 12 and 13. The output of the divider circuit 11 is coupled to a comparator circuit 14 by means of a line 15. A second input of the comparator circuit 14 is coupled to a memory 16 by means of a line 17. The output of the comparator 14 is provided on a line 18.

In operation, radiation having a frequency in the visible spectrum is received from the source 4 by the photodetectors 5 and 6 through the filters 2 and 3. The radiation from the source 4 may be emitted, reflected or scattered radiation. The magnitude of the radiation received from the source 4 by the photo-detectors 5 and 6 is a function of the transmittance of the filters 2 and 3, respectively.

As seen from FIG. 1, the output of filter 2 decreases with increasing wavelength, while the output of filter 3 increases with increasing wavelength in a substantially linear manner over a bandwidth of 575–590 nanometers. With identical photo-detectors 5 and 6, the outputs of the photo-detectors 5 and 6 will vary in accordance with the transmittance of the filters 2 and 3.

With the outputs of the photo-detectors 5 and 6 varying in accordance with the transmittance of the filters 2 and 3, the outputs of the photo-detectors 5 and 6 are integrated in integrating circuits 7 and 9. The outputs of the integrating circuits 7 and 9 are then divided to form a ratio in the divider circuit 11. It will be appreciated that, while the discussion herein uses the term "frequency," it is understood that the term frequency is intended to include a narrow band of frequencies or what may also be described as the dominant wavelength of the radiation. Accordingly, the output of the divider 11 is a value corresponding to a ratio of the transmittance of the filters 2 and 3 at a particular dominant wavelength. As seen in FIG. 1, if the dominant wavelength is 580 nanometers, the ratio formed in divider 11 and the output of the divider 11 is a value corresponding to 2. If, in a particular application, it is desirable, the ratio may be inverted and the value at the output of the divider 2 will correspond to 0.5.

After the ratio is generated in the divider 11 it is compared with pre-sorted ratios from the memory 16 in the comparator 14. When a correspondence is achieved between the output of the divider 11 and a value stored in the memory 16, in the comparator 14, an indication is provided at the output of the comparator 14 on the line 18. The indication at the output of the comparator 14 on the line 18 corresponds to the value associated with the matched ratio. In each case, the corresponding value at the output of the comparator 18 is a number corresponding to the wavelength of the radiation detected. In the example given the radiation detected is 580 nanometers.

Prior to the use of the apparatus of FIG. 2 to measure the frequency of radiation from the source 4, to obtain the pre-stored ratios, the memory 16 is pre-stored with a plurality of values corresponding to the ratio of the relative transmittance of the filters 2 and 3 for a plurality of pre-selected wavelengths within a predetermined band. The number of pre-selected frequencies throughout the band of interest may vary, depending upon the application. Obviously, the greater the number of preselected frequencies, the greater is the resolution of the apparatus. For outputs from the divider 11 which do not correspond exactly with a pre-stored value in the memory 16, the comparator 14 still provides an output, but the output of the comparator 14 is provided with an indication that the wavelength detected is approximate.

Figure 3:
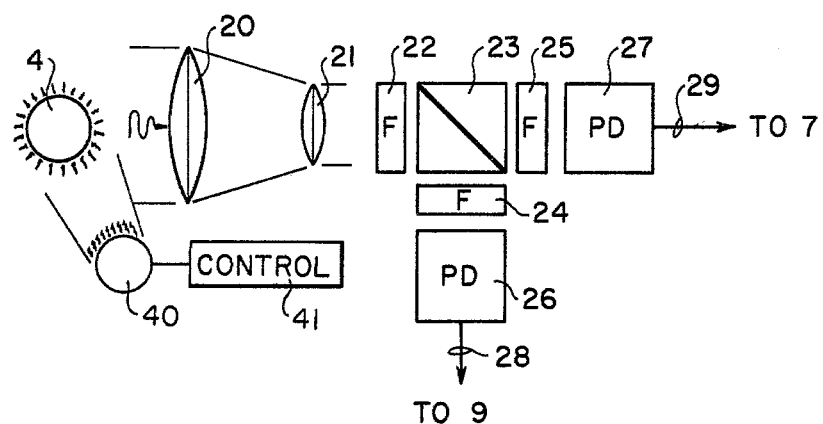
FIG. 3 is an alternative embodiment according to the present invention.

Referring to FIG. 3, there is provided in an alternative embodiment of the present invention a focusing lens 20, a collimating lens 21 and a bandpass or cutoff filter 22. Optically coupled to the filter 22, there is provided a beam splitter 23. Radiation from the beam splitter 23 is passed through a pair of filters 24 and 25 to a pair of photo-detectors 26 and 27, respectively. The outputs of the photo-detectors 26 and 27 are provided on an output line 28 and 29, respectively. The output lines 28 and 29 are coupled to a pair of integrating circuits such as integrating circuits 7 and 9 of FIG. 2 and by means of the integrating circuits to a divider, comparator and memory circuit, as described above with respect to FIG. 2.

The filters 24 and 25 are substantially identical to the filters 2 and 3 described above with respect to FIG. 2 and have relative transmittance characteristics as discussed above with respect to FIG. 1.

In operation, radiation emitted, reflected or scattered from the source 4 is focused by the lens 20 onto the collimating lens 21. It is collimated and directed to the filter 22. The filter 22 is a bandpass or cutoff filter provided for blocking non-visible radiation from the beam splitter 23. It may also be of a type used for limiting visible radiation to a selected portion of the visible spectrum. The radiation impinging on the beam splitter 23 is partially transmitted and partially reflected in the beam splitter 23 in a conventional manner. The transmitted radiation is directed through the filter 25 to the photo-detector circuit 29. The reflected radiation is directed through the filter 24 to the photo-detector 26.

Except for the presence and function of the lens 20 and 21 and the beam-splitter 23 which function in a conventional manner, the operation of the apparatus of FIG. 3 is in all other respects substantially identical to the operation of the apparatus of FIG. 2 as described above.

Figure 4:
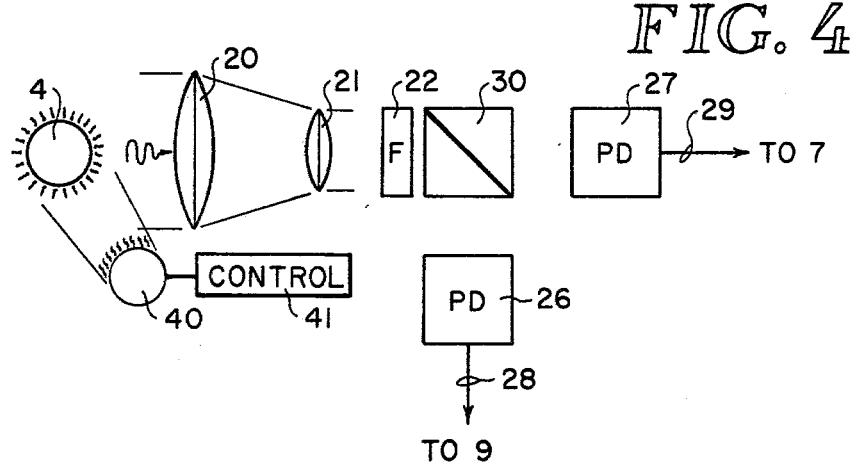
FIG. 4 is a further alternative embodiment according to the present invention.

Referring to FIG. 4, there is provided in another embodiment of the present invention a differential beam splitter 30. The beam splitter 30 replaces in a circuit otherwise substantially identical to the apparatus of FIG. 3 the beam splitter 23 and the filters 24 and 25 of the apparatus of FIG. 3.

Figure 5:
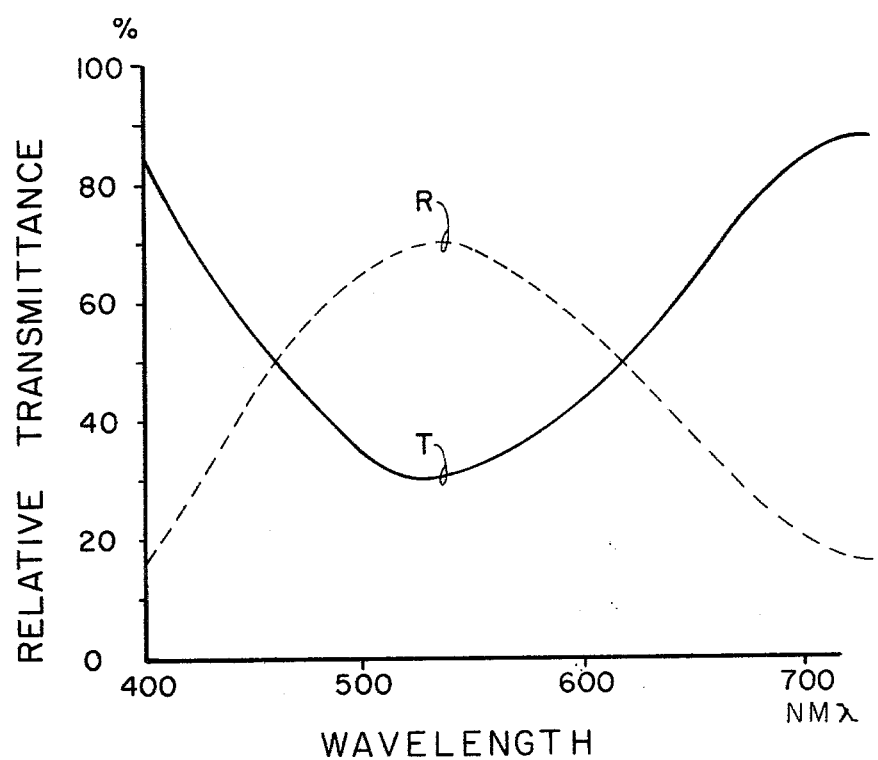
FIG. 5 shows curves of the relative reflectance and transmittance of a commercially available beam splitter useable in an apparatus as shown in FIG. 4 according to the present invention.

Referring to FIG. 5, the beam splitter 30 is provided with a differential reflectance and transmittance as represented by the curves designated R and T in the figure. As seen in the figure, from approximately 550–600 nanometers and beyond, the reflectance of the beam splitter 30 decreases with increasing wavelength while the transmittance of the beam splitter 30 increases with increasing wavelength in a manner corresponding to the negative and positive slopes with increasing wavelength of the filters 2 and 3 and 25 and 26 represented by the curves A and B of FIG. 1.

With the exception of the beam splitter 30 replacing the beam splitter 23 and filters 24 and 25 of the apparatus of FIG. 3, the apparatus of FIG. 4 is otherwise substantially identical and functions in substantially the same manner as the apparatus of FIG. 3, as described above.

As described above, the apparatus of the present invention is used for measuring the frequency of emitted, scattered and reflected radiation. In the case of a source 4 providing emitted radiation, the measurements can be made entirely in the absence of ambient radiation. In the case of a source 4 of scattered and reflected radiation, a source of external radiation is required to illuminate the object or surface under test. The external source may be a lamp external to the apparatus described herein or a lamp forming an integral part of the apparatus described herein.

Referring to FIGS. 2, 3 and 4, to provide a source of external radiation in the absence of any other external source, there is provided in each of the embodiments an internal lamp 40. The lamp 40 is preferably a source of broadband or white light, such as obtained from a tungsten filament. Coupled to the lamp 40 there is provided a control circuit 41 for controlling the operation of the lamp.

In operation, when the lamp 40, or other external source is used for illuminating the source 4, other ambient radiation is typically shielded from the source 4 for providing a more accurate and meaningful measurement.

To measure the frequency of emitted, as distinguished from scattered and reflected radiation from a source of radiation in the presence of other ambient radiation, the apparatus of the present invention may be used in conjunction with the apparatus disclosed and described in U.S. Pat. No. 4,061,925, issued Dec. 6, 1977 to one of the applicants of the present application and assigned to the assignee of the present application.

With the apparatus described in U.S. Pat. No. 4,061,925 the intensity of the ambient radiation in the absence of radiation from the source under test is determined. Then, the intensity of the ambient radiation, together with radiation from the source under test, is determined. Thereafter, a value corresponding to the intensity of the radiation in the absence of radiation from the device under test, is subtracted from a value corresponding to the intensity of the combined radiation for providing a value corresponding to the intensity of the radiation from the device under test.

While a number of embodiments of the present invention are described, it is contemplated that still other modifications and changes may be made by those skilled in the art without departing from the spirit and scope of the present invention. Accordingly, it is intended that the scope of the present invention not be limited to the embodiments described but determined by the claims hereinafter provided and their equivalents.

What is claimed is:

1. A frequency measuring apparatus comprising:
    means responsive to radiation from a source of radiation for providing a first output having a magnitude which increases and a second output having a magnitude which decreases with an increase in the frequency of said radiation;
    means providing a third output corresponding to the ratio of the magnitudes of said first and said second outputs; and
    means responsive to said third output for providing a discrete output for each one of a plurality of discrete frequencies of said radiation as said frequency of said radiation changes.

2. A frequency measuring apparatus according to claim 1 wherein said means responsive to said third output comprises means for comparing said third output with values corresponding to predetermined frequencies of said radiation.

3. A frequency measuring apparatus according to claim 1 wherein said first and said second output providing means comprise a bandpass filtering means for blocking from said radiation responsive means predominantly nonvisible radiation from said source.

4. A frequency measuring apparatus according to claim 1 wherein said first and said second output providing means comprise a first filter means having a transmittance which increases and a second filter means having a transmittance which decreases with an increase in the frequency of said radiation.

5. A frequency measuring apparatus according to claim 1 wherein said first and said second output providing means comprise a frequency dependent beam splitter wherein the magnitude of transmitted and reflected radiation therefrom varies as a function of the frequency of said radiation.

6. A frequency measuring apparatus according to claim 2 wherein said comparing means comprises: means for storing said values corresponding to said predetermined frequencies of said radiation; and
means for comparing said stored values and said third output.

7. A frequency measuring apparatus according to claim 1 wherein said first and said second output providing means comprise a first and a second photo-detecting apparatus and means for integrating the output of said photo-detecting apparatus; and said ratio providing means comprises means for dividing the integrated outputs of said photo-detecting apparatus.

8. A frequency measuring apparatus according to claim 7 wherein said photo-detecting apparatus comprises a first and a second photo-detecting means, and a first filter means having a transmittance which increases and a second filter means having a transmittance which decreases with an increase in the frequency of said radiation.

9. A frequency measuring apparatus according to claim 8 wherein said photo-detecting apparatus comprises means for directing radiation from said source of radiation to said first and said second photo-detecting means through said first and second filter means, respectively.

10. A frequency measuring apparatus according to claim 8 wherein said first and second filter means are selected from types of filter means known as interference, reflective and absorbing filter means.

11. A frequency measuring apparatus according to claim 9 wherein said radiation directing means comprises a beam splitting apparatus.

12. A frequency measuring apparatus according to claim 11 wherein said radiation-directing means comprises:
third filter means; and means for directing radiation from said source of radiation through said third filter means to said beam splitting apparatus.

13. A frequency measuring apparatus according to claim 12 wherein said third filter means comprises filter means selected from the group of filter means consisting of bandpass and cutoff filter means.

14. A frequency measuring apparatus according to claim 12 wherein said means for directing radiation through said third filter means comprises lens means.

15. A frequency measuring apparatus according to claim 14 wherein said lens means comprises focusing and collimating lens means.

16. A method of measuring the frequency of radiation from a source of radiation comprising the steps of:
providing a first output having a magnitude which increases and a second output having a magnitude which decreases with an increase in the frequency of said radiation;
providing a third output corresponding to the ratio of the magnitudes of said first and said second outputs; and
comparing said third output with predetermined values corresponding to pre-selected known frequencies of said radiation for providing an output corresponding to the frequency of said radiation.

17. A method according to claim 16 comprising the step of pre-storing said predetermined values corresponding to said pre-selected known frequencies of said radiation in a storing means and wherein said step of comparing comprises the step of comparing said third output with said prestored values.

18. A method according to claim 16 wherein said step of pre-storing said values comprises the steps of:
providing said first and said second outputs for a plurality of pre-selected known frequencies of said radiation within a predetermined band of said frequencies, providing said third output for each of said plurality of pre-selected known frequencies; and
storing a value corresponding to each of said third outputs.

19. A method according to claim 17 comprising the step of illuminating said source of radiation for providing reflected or scattered radiation from said source.

* * * * *